US012605811B2

(12) United States Patent
Kuo

(10) Patent No.: US 12,605,811 B2
(45) Date of Patent: Apr. 21, 2026

(54) TORQUE STRUCTURE

(71) Applicant: Wen-Chin Kuo, Taichung (TW)

(72) Inventor: Wen-Chin Kuo, Taichung (TW)

( * ) Notice: Subject to any disclaimer, the term of this patent is extended or adjusted under 35 U.S.C. 154(b) by 349 days.

(21) Appl. No.: 18/431,637

(22) Filed: Feb. 2, 2024

(65) Prior Publication Data

US 2025/0249560 A1 Aug. 7, 2025

(51) Int. Cl.

| | |
|---|---|
| ***B25B 23/14*** | (2006.01) |
| ***B25B 13/46*** | (2006.01) |
| ***B25B 23/142*** | (2006.01) |
| *B25B 23/00* | (2006.01) |

(52) U.S. Cl.

CPC .......... *B25B 23/141* (2013.01); *B25B 13/463* (2013.01); *B25B 23/1427* (2013.01); *B25B 23/0007* (2013.01)

(58) Field of Classification Search

CPC ......... B25B 13/02; B25B 13/10; B25B 13/46; B25B 13/463; B25B 13/48; B25B 13/481; B25B 23/0007; B25B 23/0021; B25B 23/14; B25B 23/141; B25B 23/142; B25B 23/1427; B25B 23/16

See application file for complete search history.

(56) References Cited

U.S. PATENT DOCUMENTS

| | | | | |
|---|---|---|---|---|
| 2,972,271 | A * | 2/1961 | Gill | B25B 23/1427 81/480 |
| 3,581,606 | A * | 6/1971 | Grabovac | B25B 23/1427 81/483 |
| 6,463,834 | B2 * | 10/2002 | Kemp | B25B 23/1427 81/481 |
| 9,089,957 | B2 | 7/2015 | Chen | |
| 2013/0152747 | A1 * | 6/2013 | Kerboul | B25B 23/0028 81/58 |

FOREIGN PATENT DOCUMENTS

CN 201128131 * 10/2008

* cited by examiner

*Primary Examiner* — Robert J Scruggs

(74) *Attorney, Agent, or Firm* — Justin Lampel

(57) ABSTRACT

A torque structure includes a first body provided with a first receiving chamber, a second body provided with multiple first through holes, an elastic member received in the second body, a third body provided with a mounting portion having multiple third through holes and a second receiving chamber, and an operation portion having a first receiving recess, a rotation member having a first outer peripheral face provided with multiple protruded portions and multiple recessed portions, a push member received in the second receiving chamber and pressing one of the protruded portions or one of the recessed portions, a moving member provided with a perforation, and a second fastening member extending through the first through holes, the third through holes, and the perforation.

9 Claims, 9 Drawing Sheets

B-B

TORQUE STRUCTURE

FIELD OF THE INVENTION

The present invention relates to a hand tool and, more particularly, to a torque structure.

DESCRIPTION OF THE RELATED ART

A conventional torque wrench was disclosed in the U.S. Pat. No. 9,089,957, and comprises a wrench body 10, an adapter 20, a pillar 30, a clutch member 40, a handle 50, and a resilient member 60. However, such a conventional torque wrench has the following disadvantage. The tube 11 and the head 12 form an integral structure. The tube 11 has an interior formed with a through hole for receiving the clutch member 40 and the handle 50. It is difficult to work the tube 11 to form the through hole having a determined length, thereby complicating the working process, and thereby increasing the cost of fabrication.

BRIEF SUMMARY OF THE INVENTION

In accordance with the present invention, there is provided a torque structure comprising a first body, a second body, an elastic member, a third body, a rotation member, a push member, and a moving member. The first body is provided with a first receiving chamber. The second body is provided with multiple first through holes. The elastic member is received in the second body. The third body is mounted on the second body and provided with a mounting portion and an operation portion. The mounting portion is provided with multiple third through holes aligning with the first through holes. The operation portion is provided with a first receiving recess. The mounting portion is provided with a second receiving chamber. The rotation member has a first outer peripheral face and a first inner peripheral face. The first outer peripheral face is provided with multiple protruded portions and multiple recessed portions. The push member is received in the second receiving chamber and rests on or presses one of the protruded portions or one of the recessed portions. The moving member is provided with a perforation aligning with the first through holes and the third through holes. A second fastening member extends through the first through holes, the third through holes, and the perforation.

According to the primary advantages of the present invention, the third body is assembled with the second body. The second body is a hollow tube having a simpler working process, thereby saving the cost of fabrication.

According to another advantage of the present invention, the moving member has to be movable so that the third body is allowed to have a torque slip effect. The moving member is provided with the perforation allowing passage of the second fastening member, so that the moving member is movable. In such a manner, the second body that is used for mounting the fourth body can also be used for mounting the third body. Thus, the second body is a common part for the third body and the fourth body, thereby saving the cost of fabrication.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
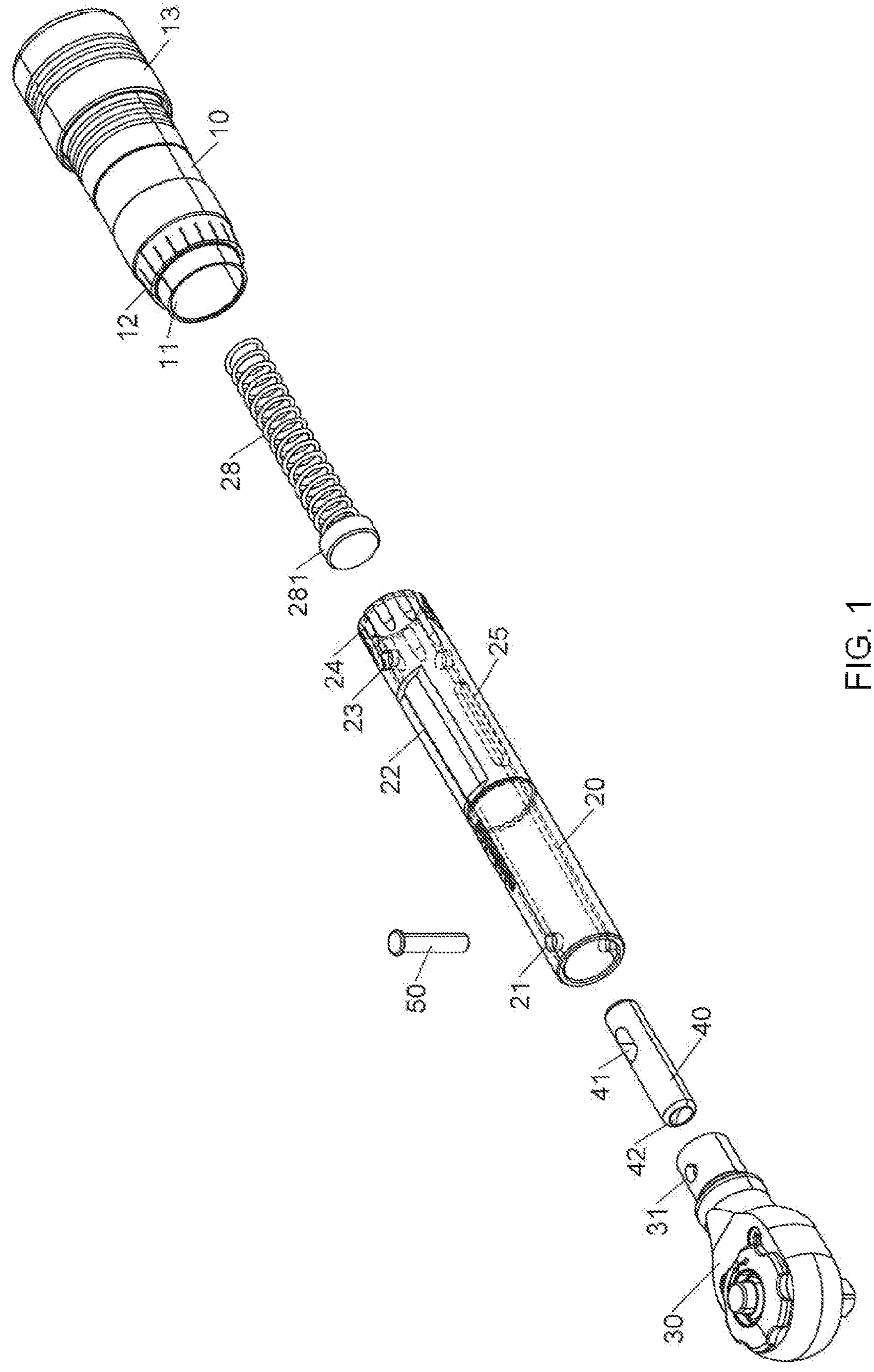
FIG. 1 is an exploded perspective view of a torque structure in accordance with the preferred embodiment of the present invention.

Referring to the drawings and initially to FIGS. 1-9, a torque structure in accordance with the preferred embodiment of the present invention comprises a first body 10, a second body 20, an elastic member 28, a third body 30, a rotation member 35, a push member 36, and a moving member 40.

The first body 10 is a circular rod and is held by a user. The first body 10 has a first end having an interior provided with a first receiving chamber 11 which is a hollow circular hole. The first body 10 is provided with a first indicator 12. The first indicator 12 is arranged on an exterior of the first body 10 and includes multiple graduations (or scales) spaced and arranged annularly. The first body 10 has a second end provided with a control ring 13 movable or operable relative to the first body 10. The control ring 13 is distant from the first indicator 12.

The second body 20 is a hollow tube and is pivotally mounted on the first body 10. The second body 20 is partially received in the first receiving chamber 11 and has a first end provided with multiple first through holes 21. Each of the first through holes 21 has a circular shape and penetrates the second body 20. Preferably, the second body 20 has two first through holes 21 opposite to each other. The second body 20 has a second end provided with a first guide slot 22 extending in a lengthwise direction of the second body 20. The first guide slot 22 has an elongate shape and is hidden in the first receiving chamber 11. The first guide slot 22 is distant from the first through holes 21. The second body 20 is provided with multiple second through holes 23 close to the first guide slot 22. The second through holes 23 are hidden in the first receiving chamber 11. The first guide slot 22 is located between the first through holes 21 and the second through holes 23. The second through holes 23 are arranged annularly about an axis of the second body 20. Preferably, the second body 20 has two second through holes 23 opposite to each other. Each of the second through holes 23 has a circular shape and penetrates the second body 20. The second end of the second body 20 has an outer peripheral face provided with multiple positioning grooves 24 hidden in the first receiving chamber 11. The positioning grooves 24 are arranged annularly about the axis of the second body 20. Preferably, the second body 20 has ten, twelve or twenty positioning grooves 24. Each of the positioning grooves 24 has a concave shape. The second body 20 is provided with a second guide slot 25 hidden in the first receiving chamber 11. The second guide slot 25 is opposite to the first guide slot 22 and has an elongate shape.

The elastic member 28 is received in the second body 20, and provided with a push block 281.

The control ring 13 is operated to control the first body 10 so that the first body 10 is rotatable or non-rotatable relative to the second body 20. When the first body 10 is rotatable relative to the second body 20, the first body 10 is rotated relative to the second body 20 to adjust a length of the elastic member 28 and to regulate a torque value of the torque structure.

When the first body 10 is rotatable relative to the second body 20, the first body 10 is rotated and displaced relative to the second body 20. The first body 10 includes inner parts which are driven by the first body 10 to adjust the length of the elastic member 28 and to regulate the torque value of the torque structure.

The control ring 13 is moved or operated relative to the first body 10 between a locked position where the first body 10 is non-rotatable relative to the second body 20, and an unlocked position where the first body 10 is rotatable relative to the second body 20. When the control ring 13 is moved to the unlocked position, the first body 10 is rotated relative to the second body 20, and a prompt sound is produced between the control ring 13 and the second body 20, to remind a user of a rotation state of the first body 10 and a positioning state between the control ring 13 and the second body 20.

The third body 30 is mounted on the second body 20. The second body 20 is mounted between the first body 10 and the third body 30. The third body 30 is provided with a mounting portion 301 and an operation portion 302. The mounting portion 301 is mounted in the second body 20. The mounting portion 301 is provided with multiple third through holes 31 aligning with the first through holes 21. The third through holes 31 have a number equal to that of the first through holes 21. Preferably, the mounting portion 301 has two third through holes 31. The operation portion 302 is provided with a first receiving recess 32. The first receiving recess 32 has a circular shape and penetrates the operation portion 302. The mounting portion 301 has an interior provided with a second receiving chamber 33 which is perpendicular to and connected with the third through holes 31. The second receiving chamber 33 extends to the first receiving recess 32. The third body 30 is provided with two fastening (or fixing) portions 34 located between the third through holes 31 and the first receiving recess 32. Each of the two fastening portions 34 is a circular hole.

The rotation member 35 is pivotally mounted in the first receiving recess 32. The rotation member 35 has a ring shape and has an exterior provided with a first outer peripheral face 351 and an interior provided with a first inner peripheral face 352. The first outer peripheral face 351 is provided with multiple protruded portions 353 and multiple recessed portions 354 which are spaced and arranged annularly. Each of the recessed portions 354 is located between two of the protruded portions 353. Each of the protruded portions 353 has a convex shape. Each of the recessed portions 354 has a concave shape with a single arcuate face. The protruded portions 353 are tangent to the recessed portions 354.

The push member 36 is received in the third body 30 and is movable through a distance. The push member 36 is received in the second receiving chamber 33. The push member 36 rests on or presses one of the protruded portions 353 or one of the recessed portions 354. Preferably, the push member 36 is a ball.

A drive head 37 is received in the first receiving recess 32 and the rotation member 35. The drive head 37 includes a ratchet structure that is rotated in a normal direction and a reverse direction. Alternatively, the drive head 37 is rotated in a single direction. The drive head 37 has an end provided with a mounting stud. The mounting stud of the drive head 37 has a square shape and protrudes from the first receiving recess 32.

A cover 38 is mounted in an opening of the first receiving recess 32 and covers the first receiving recess 32. The mounting stud of the drive head 37 protrudes from the cover 38.

Two first fastening (or fixing) members 39 extend through the two fastening portions 34 and the cover 38 so that the cover 38 is secured by the two first fastening members 39 to the third body 30 without detachment.

The moving member 40 is received in the second receiving chamber 33 and is movable through a distance in the second receiving chamber 33. The moving member 40 is a circular rod and provided with a perforation 41 aligning with the first through holes 21 and the third through holes 31. The perforation 41 has an elongate shape. The moving member 40 has a first end provided with an abutting portion 42 resting on or pressing the push member 36. The moving member 40 and the push member 36 are movable simultaneously through a distance in the second receiving chamber 33. The abutting portion 42 is a circular dimple or depression partially receiving the push member 36. The moving member 40 has a second end directly pressing the push block 281 or indirectly pressing the elastic member 28.

The third body 30 has a torque slip or laterally shiftable effect by cooperation of the elastic member 28 and the moving member 40.

A second fastening (or fixing) member 50 extends through the first through holes 21, the third through holes 31, and the perforation 41, and limits a displacement distance of the moving member 40. The perforation 41 is movable relative to the second fastening member 50. The second body 20 and the third body 30 are assembled by the second fastening member 50. Preferably, the second fastening member 50 is an elongate rod or a pin.

In assembly, referring to FIGS. 6-9 with reference to FIGS. 1-5, the elastic member 28 is received in the second body 20. The first end of the second body 20 is assembled with the first body 10, and the second end of the second body 20 is assembled with the third body 30. The rotation member 35 is pivotally mounted in the first receiving recess 32. The push member 36 presses one of the recessed portions 354. The second fastening member 50 extends through the first through holes 21, the third through holes 31, and the perforation 41.

The control ring 13 is disposed at the locked position. When the first body 10 is rotated to exceed a preset torque value, the push member 36 cannot further drive and rotate the rotation member 35, so that the push member 36 is detached from one of the recessed portions 354 and presses one of the protruded portions 353. At this time, the push member 36 is pushed by one of the protruded portions 353, so that the push member 36 and the moving member 40 are displaced in the second receiving chamber 33, and the perforation 41 is moved relative to the first through holes 21, the third through holes 31, and the second fastening member 50. Thus, the third body 30 has a torque slip effect.

Figure 10:
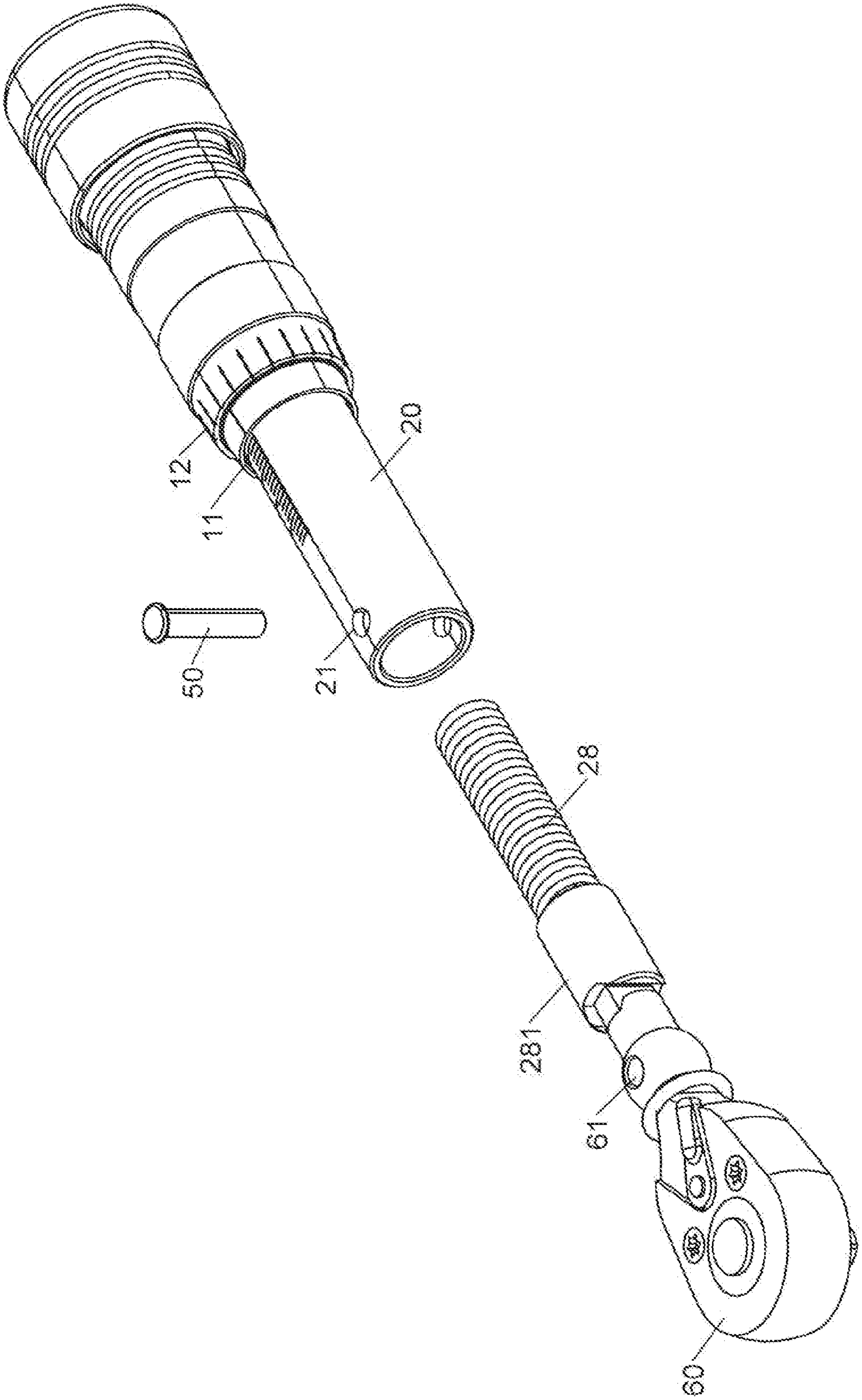
FIG. 10 is a partial exploded perspective view of a torque structure in accordance with another preferred embodiment of the present invention.

Referring to FIG. 10 with reference to FIG. 1, the second body 20 and the third body 30 are assembled by the second fastening member 50 so that the second body 20 does not need to change its structure. The third body 30 is replaced by a fourth body 60. The fourth body 60 is a head of a conventional torque structure. The fourth body 60 is provided with a fourth through hole 61. In assembly, the second body 20 and the fourth body 60 are also assembled by the second fastening member 50. Thus, the second body 20 is assembled with the third body 30 and the fourth body 60.

Figure 2:
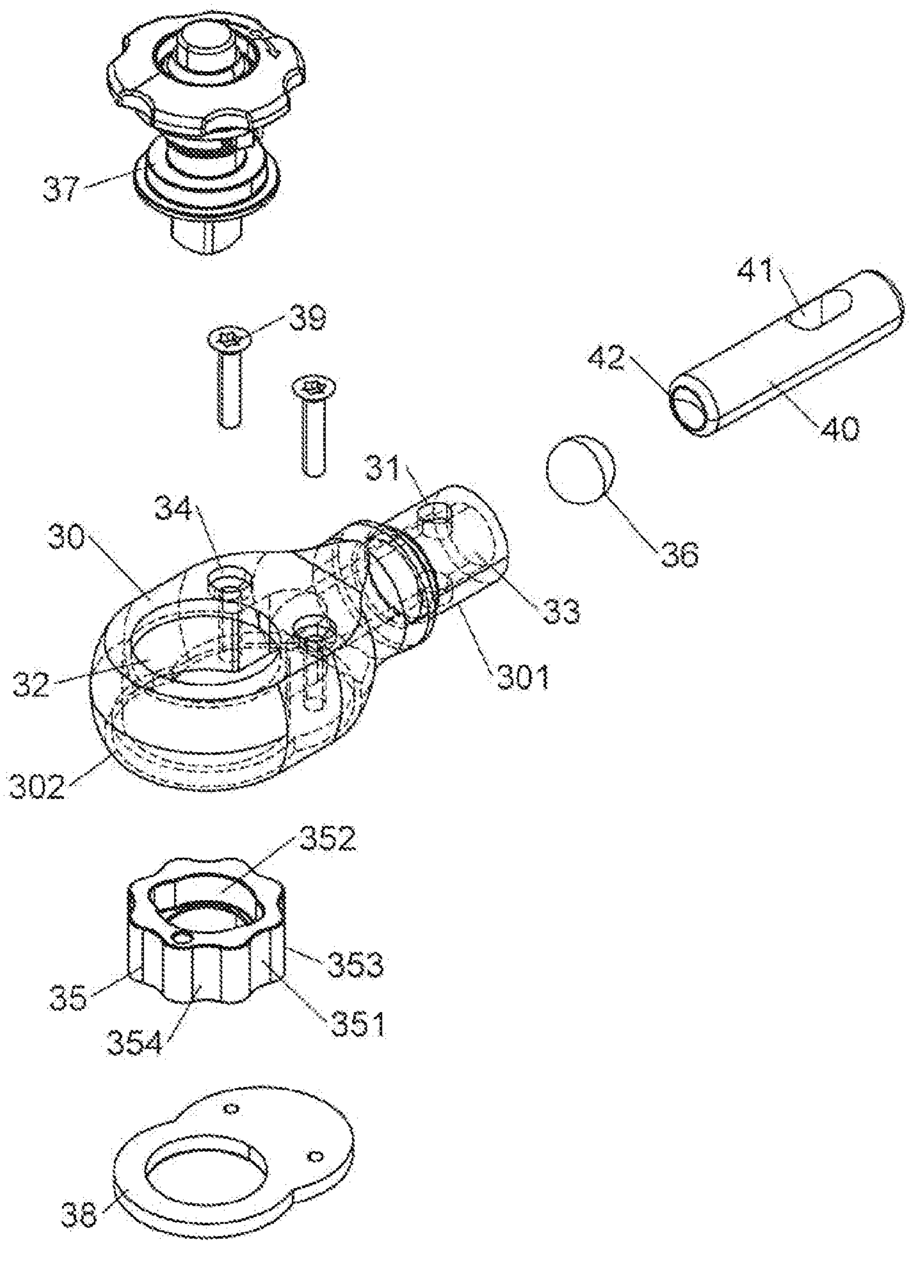
FIG. 2 is a partial exploded perspective view of the torque structure in accordance with the preferred embodiment of the present invention.
Figure 3:
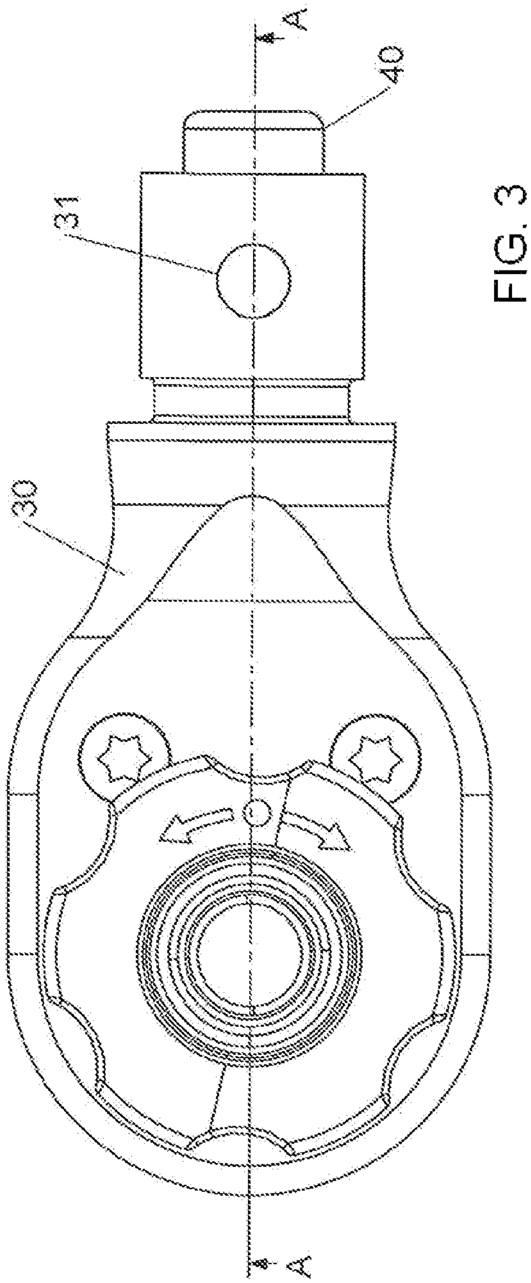
FIG. 3 is a partial top view of the torque structure in accordance with the preferred embodiment of the present invention.
Figure 4:
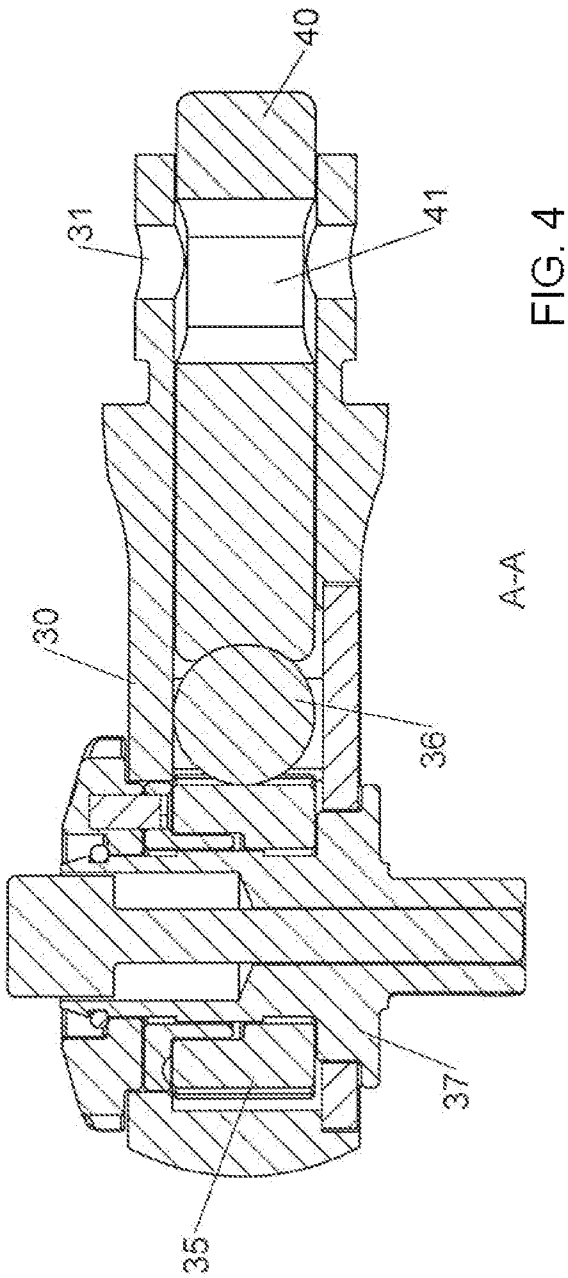
FIG. 4 is a cross-sectional view of the torque structure taken along line A-A as shown in FIG. 3.
Figure 5:
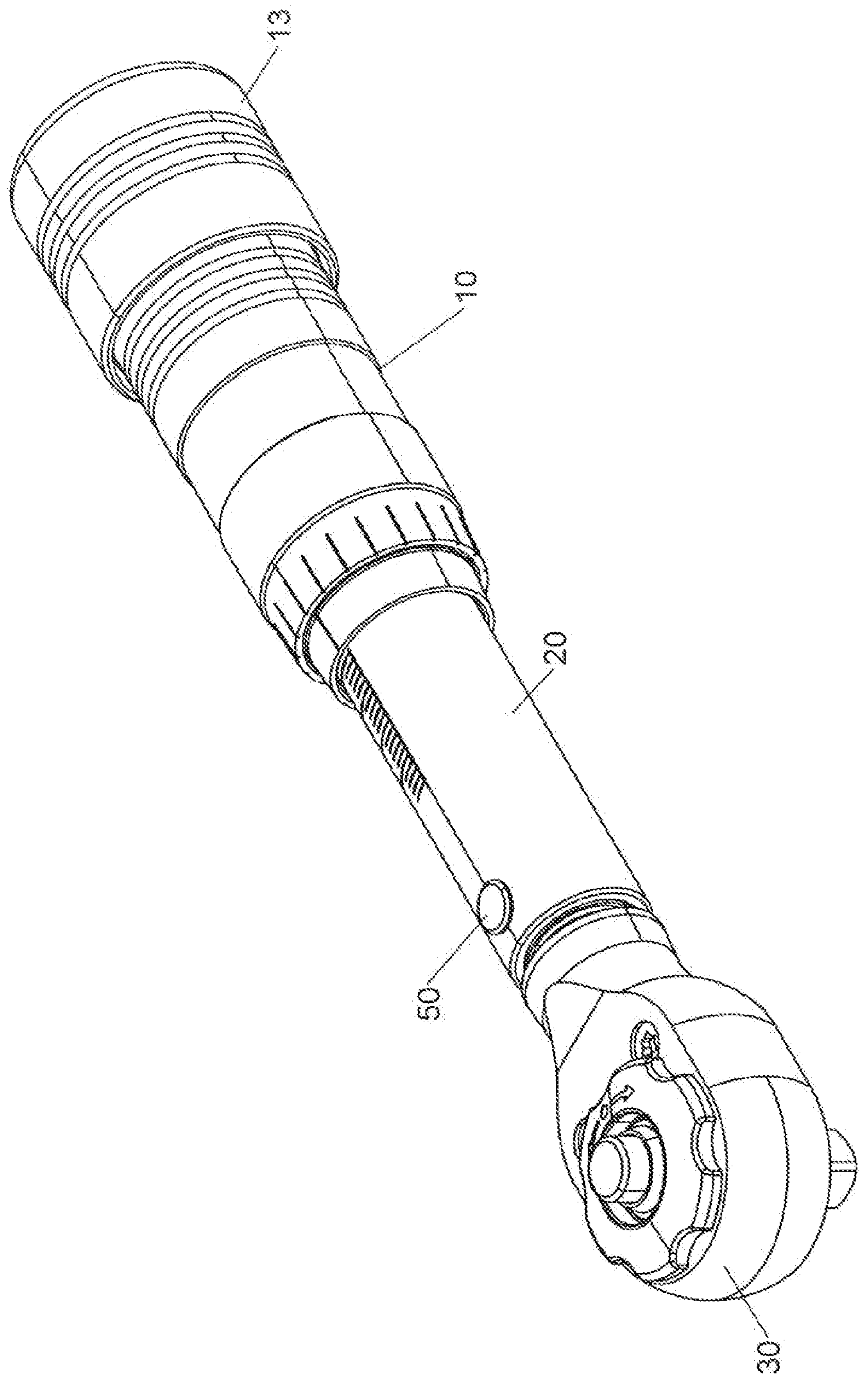
FIG. 5 is a perspective view of the torque structure in accordance with the preferred embodiment of the present invention.
Figure 6:
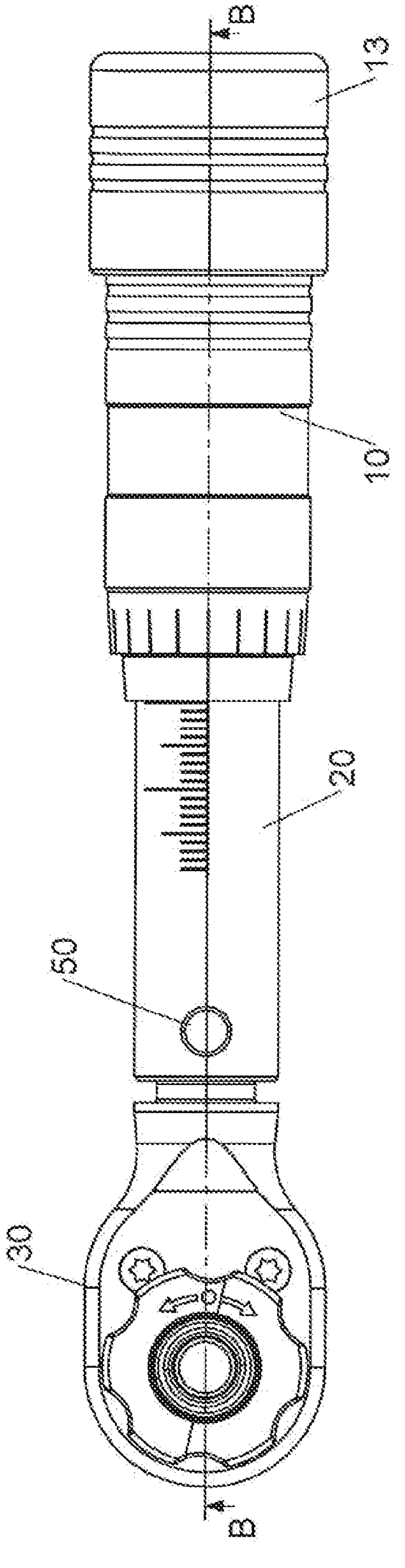
FIG. 6 is a top view of the torque structure in accordance with the preferred embodiment of the present invention.
Figure 7:
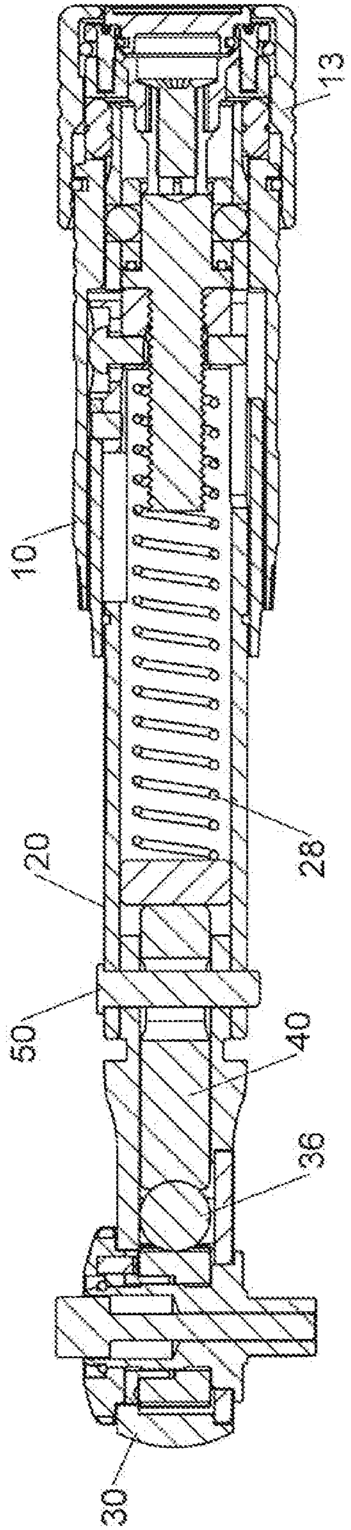
FIG. 7 is a cross-sectional view of the torque structure taken along line B-B as shown in FIG. 6.
Figure 8:
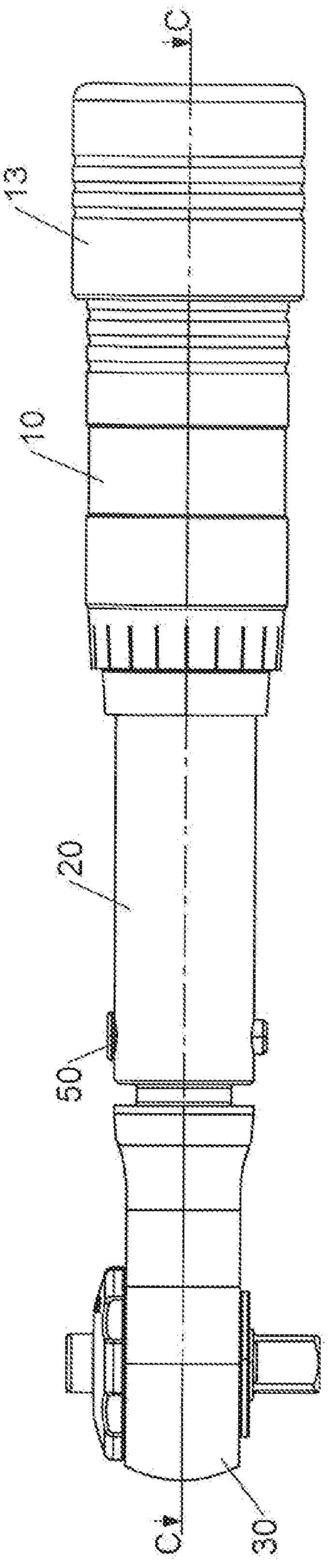
FIG. 8 is a side view of the torque structure in accordance with the preferred embodiment of the present invention.
Figure 9:
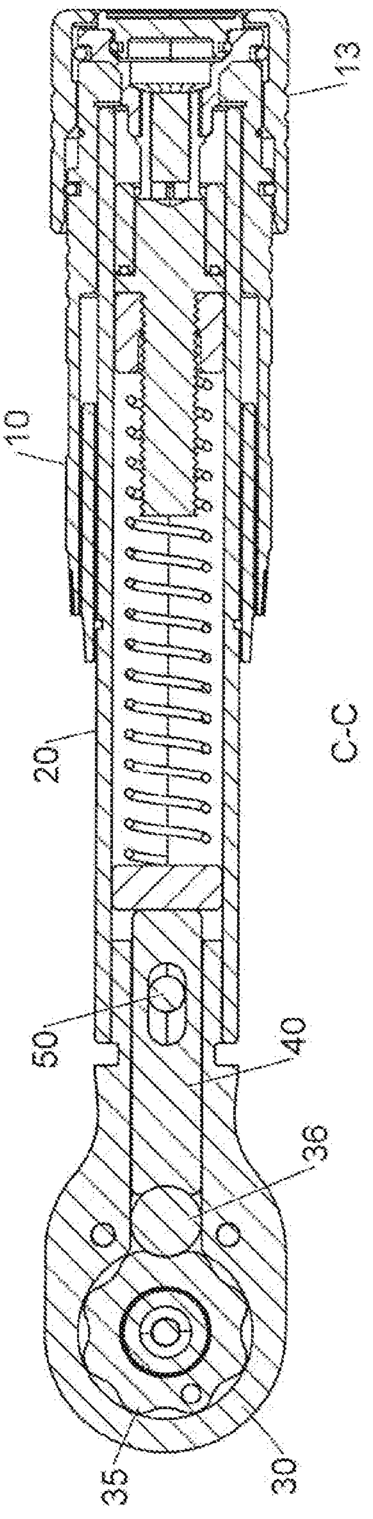
FIG. 9 is a cross-sectional view of the torque structure taken along line C-C as shown in FIG. 8.
Figure 11:
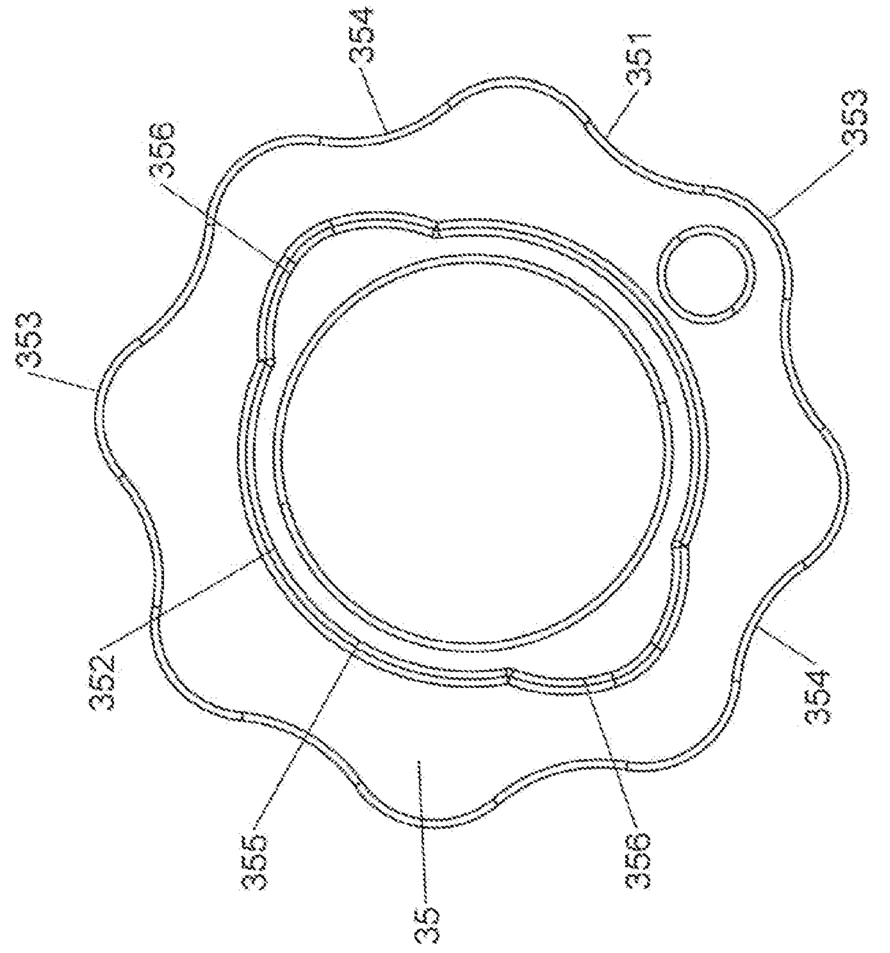
FIG. 11 is a top view of a rotation member of the torque structure in accordance with another preferred embodiment of the present invention.

Referring to FIG. 11 with reference to FIG. 2, the first inner peripheral face 352 is provided with a first pivot portion 355 and multiple second receiving recesses 356. Preferably, the first inner peripheral face 352 has two second receiving recesses 356 opposite to each other.

Figure 12:
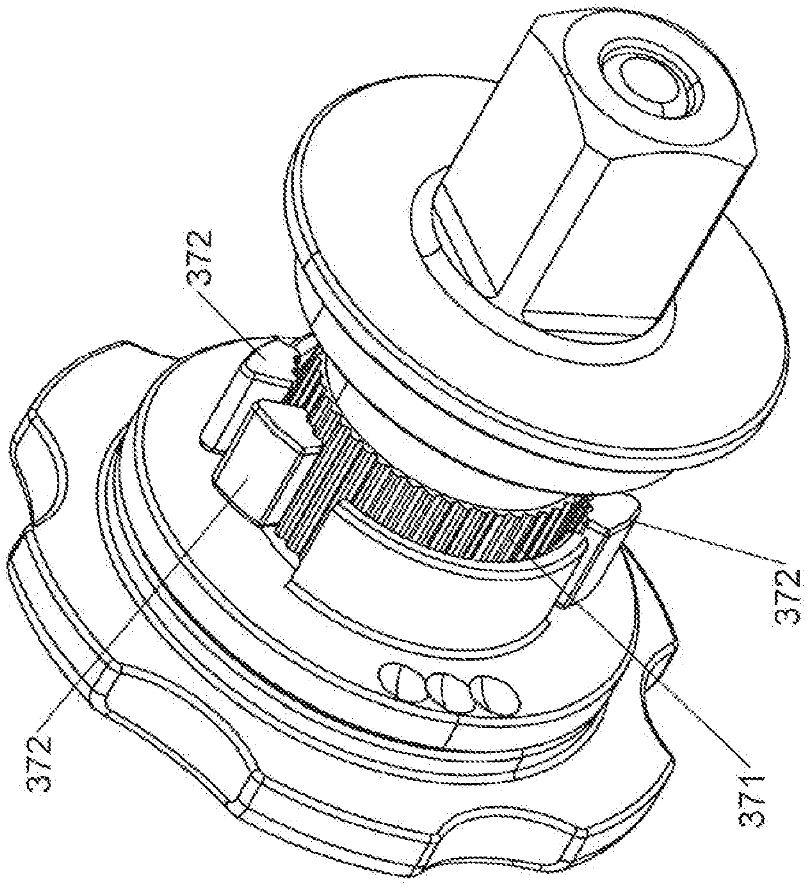
FIG. 12 is a perspective view of a drive head of the torque structure in accordance with another preferred embodiment of the present invention.

Referring to FIG. 12 with reference to FIG. 11, the drive head 37 is pivotally mounted in the rotation member 35 and provided with a ratchet wheel 371 having a toothed shape arranged annularly. The drive head 37 is provided with multiple locking teeth 372 meshing with the ratchet wheel 371. The locking teeth 372 are received in the second receiving recesses 356. The drive head 37 controls normal and reverse rotation by cooperation of the ratchet wheel 371 and the locking teeth 372. A spring (not shown) is biased between two of the locking teeth 372 to provide a restoring effect to the locking teeth 372.

Accordingly, the torque structure of the present invention has the following advantages.

1. The third body 30 is assembled with the second body 20. The second body 20 is a hollow tube having a simpler working process, thereby saving the cost of fabrication.

2. The second body 20 is both available for the third body 30 and the fourth body 60. The fourth body 60 has a conventional torque structure. Thus, the second body 20 is a common part for the third body 30 and the fourth body 60, thereby saving the cost of fabrication.

3. When the first body 10 is rotated to exceed the preset torque value, the push member 36 cannot further rotate the rotation member 35, and is pushed by one of the protruded portions 353, such that the push member 36 and the moving member 40 are displaced in the second receiving chamber 33, and the perforation 41 is moved relative to the first through holes 21, the third through holes 31, and the second fastening member 50. Thus, the third body 30 has a torque slip effect. In such a manner, the perforation 41 allows movement of the moving member 40.

4. The moving member 40 is provided with the perforation 41 allowing passage of the second fastening member 50, so that the moving member 40 is movable relative to the second fastening member 50. Thus, the third body 30 is assembled with the second body 20.

5. The primary principle of the present invention is in that, the moving member 40 has to be movable so that the third body 30 is allowed to have a torque slip effect. The moving member 40 is provided with the perforation 41 allowing passage of the second fastening member 50, so that the moving member 40 is movable. In such a manner, the second body 20 that is used for mounting the fourth body 60 can also be used for mounting the third body 30. Thus, the second body 20 is a common part for the third body 30 and the fourth body 60, thereby saving the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A torque structure comprising:

a first body, a second body, an elastic member, a third body, a rotation member, a push member, and a moving member;

wherein:

the first body has a first end having an interior provided with a first receiving chamber which is a hollow circular hole;

the first body has a second end provided with a control ring movable or operable relative to the first body;

the second body is a hollow tube and is pivotally mounted on the first body;

the second body is partially received in the first receiving chamber and has a first end provided with multiple first through holes;

the second body has a second end provided with a first guide slot extending in a lengthwise direction of the second body;

the first guide slot has an elongate shape and is hidden in the first receiving chamber;

the first guide slot is distant from the first through holes;

the second body is provided with multiple second through holes close to the first guide slot;

the second through holes are hidden in the first receiving chamber;

the first guide slot is located between the first through holes and the second through holes;

the second through holes are arranged annularly about an axis of the second body;

the second end of the second body has an outer peripheral face provided with multiple positioning grooves hidden in the first receiving chamber;

the positioning grooves are arranged annularly about the axis of the second body;

each of the positioning grooves has a concave shape;

the second body is provided with a second guide slot hidden in the first receiving chamber;

the second guide slot is opposite to the first guide slot and has an elongate shape;

the elastic member is received in the second body, and provided with a push block;

the control ring is operated to control the first body so that the first body is rotatable or non-rotatable relative to the second body;

when the first body is rotatable relative to the second body, the first body is rotated relative to the second body to adjust a length of the elastic member and to regulate a torque value of the torque structure;

the third body is mounted on the second body;

the second body is mounted between the first body and the third body;

the third body is provided with a mounting portion and an operation portion;

the mounting portion is mounted in the second body;
the mounting portion is provided with multiple third through holes aligning with the first through holes;
the operation portion is provided with a first receiving recess;
the first receiving recess has a circular shape and penetrates the operation portion;
the mounting portion has an interior provided with a second receiving chamber which is perpendicular to and connected with the third through holes;
the second receiving chamber extends to the first receiving recess;
the rotation member is pivotally mounted in the first receiving recess;
the rotation member has a ring shape and has an exterior provided with a first outer peripheral face and an interior provided with a first inner peripheral face;
the first outer peripheral face is provided with multiple protruded portions and multiple recessed portions which are spaced and arranged annularly;
each of the recessed portions is located between two of the protruded portions;
the push member is received in the third body and is movable through a distance;
the push member is received in the second receiving chamber;
the push member rests on or presses one of the protruded portions or one of the recessed portions;
the moving member is received in the second receiving chamber and is movable through a distance in the second receiving chamber;
the moving member is a circular rod and provided with a perforation aligning with the first through holes and the third through holes;
the perforation has an elongate shape;
the moving member has a first end provided with an abutting portion resting on or pressing the push member;
the moving member and the push member are movable simultaneously through a distance in the second receiving chamber;
the abutting portion is a circular dimple or depression partially receiving the push member;
the moving member has a second end directly pressing the push block or indirectly pressing the elastic member;
the third body has a torque slip effect by cooperation of the elastic member and the moving member;
a second fastening member extends through the first through holes, the third through holes, and the perforation, and limits a displacement distance of the moving member;
the perforation is movable relative to the second fastening member; and
the second body and the third body are assembled by the second fastening member.

2. The torque structure as claimed in claim 1, wherein:
the first body is a circular rod and is held by a user;
the first body is provided with a first indicator;
the first indicator is arranged on an exterior of the first body and includes multiple graduations spaced and arranged annularly; and
the control ring is distant from the first indicator.

3. The torque structure as claimed in claim 1, wherein:
each of the first through holes has a circular shape and penetrates the second body;
the second body has two first through holes opposite to each other;
the second body has two second through holes opposite to each other;
each of the second through holes has a circular shape and penetrates the second body;
the third through holes have a number equal to that of the first through holes;
the mounting portion has two third through holes; and
the second body has ten, twelve or twenty positioning grooves.

4. The torque structure as claimed in claim 1, wherein:
when the first body is rotatable relative to the second body, the first body is rotated and displaced relative to the second body; and
the first body includes inner parts which are driven by the first body to adjust the length of the elastic member and to regulate the torque value of the torque structure.

5. The torque structure as claimed in claim 1, wherein:
the control ring is moved or operated relative to the first body between a locked position where the first body is non-rotatable relative to the second body, and an unlocked position where the first body is rotatable relative to the second body; and
when the control ring is moved to the unlocked position, the first body is rotated relative to the second body, and a prompt sound is produced between the control ring and the second body, to remind a user of a rotation state of the first body and a positioning state between the control ring and the second body.

6. The torque structure as claimed in claim 1, wherein:
the third body is provided with two fastening portions located between the third through holes and the first receiving recess;
each of the two fastening portions is a circular hole;
a drive head is received in the first receiving recess and the rotation member;
the drive head includes a ratchet structure that is rotated in a normal direction and a reverse direction;
the drive head is rotated in a single direction;
the drive head has an end provided with a mounting stud;
the mounting stud of the drive head has a square shape and protrudes from the first receiving recess;
a cover is mounted in an opening of the first receiving recess and covers the first receiving recess;
the mounting stud of the drive head protrudes from the cover;
two first fastening members extend through the two fastening portions and the cover so that the cover is secured by the two first fastening members to the third body without detachment;
the first inner peripheral face is provided with a first pivot portion and multiple second receiving recesses;
the first inner peripheral face has two second receiving recesses opposite to each other;
the drive head is pivotally mounted in the rotation member and provided with a ratchet wheel having a toothed shape arranged annularly;
the drive head is provided with multiple locking teeth meshing with the ratchet wheel;
the locking teeth are received in the second receiving recesses;
the drive head controls normal and reverse rotation by cooperation of the ratchet wheel and the locking teeth; and
a spring is biased between two of the locking teeth.

7. The torque structure as claimed in claim 1, wherein each of the protruded portions has a convex shape, each of the recessed portions has a concave shape with a single arcuate face, and the protruded portions are tangent to the recessed portions.

8. The torque structure as claimed in claim 1, wherein the push member is a ball, and the second fastening member is an elongate rod or a pin.

9. The torque structure as claimed in claim 1, wherein:

the second body and the third body are assembled by the second fastening member so that the second body does not need to change its structure;

the third body is replaced by a fourth body;

the fourth body is a head of a conventional torque structure;

the fourth body is provided with a fourth through hole; and the second body and the fourth body are also assembled by the second fastening member.

* * * * *